United States Patent [19]

Rahn et al.

[11] 4,118,675
[45] Oct. 3, 1978

[54] LASER TUNING WITH AN ACOUSTO-OPTIC LENS

[75] Inventors: John P. Rahn; Marion L. Scott, both of Ridgecrest, Calif.

[73] Assignee: The United States of America as represented by the Secretary of the Navy, Washington, D.C.

[21] Appl. No.: 783,100

[22] Filed: Mar. 31, 1977

[51] Int. Cl.$^2$ .............................................. H01S 3/10
[52] U.S. Cl. ............................... 331/94.5 C; 350/358
[58] Field of Search ................ 331/94.5 M, 94.5 Q, 331/94.5 C; 350/161 W, 179; 350/358

[56] References Cited

U.S. PATENT DOCUMENTS

| | | | |
|---|---|---|---|
| 3,483,387 | 12/1969 | Davis, Jr. | 350/161 W |
| 3,735,278 | 5/1973 | Schafer et al. | 331/94.5 C |

OTHER PUBLICATIONS

Scott et al., Fast Acousto–Optic Lens Q–Switch, J. Appl. Phys., vol. 46, No. 8, (Aug. 1975), pp. 3483–3488.

Primary Examiner—William L. Sikes
Attorney, Agent, or Firm—R. S. Sciascia; Roy Miller

[57] ABSTRACT

A pulsed laser having a laser gain medium of broadband output is tuned to essentially monochromatic output. An acousto-optic cell is driven with an acoustic wave which varies linearly in frequency, causing the laser beam to be resolved into a number of essentially monochromatic focal points. The focused beam of the desired wavelength is reflected to the output through one or more apertures which block out the unwanted wavelengths.

10 Claims, 3 Drawing Figures

LASER TUNING WITH AN ACOUSTO-OPTIC LENS

BACKGROUND OF THE INVENTION

This invention relates to lasers and ways of tuning them.

A typical laser arrangement has an active laser medium or laser gain element in an optical cavity bounded by a 100% reflector on one end and a partial reflector on the output end. The gain element contains for example, an organic "dye" which fluoresces or scintillates when stimulated or "pumped" by an outside light source which flashes briefly. The scintillation then reflects briefly between the end reflectors and stimulates the dye each time it passes through until a sudden burst of laser energy is emitted which passes through the output mirror at the output end. This type of laser is referred to as a pulsed laser, rather than a continuous wave type of laser.

A variety of lasers, such as dye lasers, contain laser gain elements which emit laser light over a range of wavelengths. In many applications it is desirable to limit the laser light output from the device to one wavelength, and further, to rapidly select that wavelength, in other words, to rapidly tune the laser.

Early tuning devices were mechanical in that physical movement was required to change output wavelength. For example, the back reflector in the optical resonant cavity of a laser can be replaced with a rotatable diffraction grating. The grating reflects only one wavelength of light back through the cavity and out the output mirror. By rotating the grating to a different angle, a different wavelength of light is reflected to the output. To achieve more rapid tuning, devices were developed in which rather than rotating the diffraction grating, the angle of light incident on the grating was changed, thereby eliminating the mechanical step.

Acousto-optic (A-O) cells are among the materials which have been used to change this angle of incident light. An A-O cell is one which is transparent to light and will also propagate an acoustic, or compression, wave which will interact with the light. In one technique, light passes through the cell at an angle nearly perpendicular to its length. A flat piezoelectric crystal is attached to one end of the cell. This crystal will vibrate the cell and send acoustic waves through the cell in response to an electrical signal applied to the crystal. When light passing through the cell in one direction meets acoustic waves traveling crosswise, the light appears to be reflected from the acoustic waves, a phenomenon known as Bragg reflection. The light leaving the cell is thus diffracted-it is deflected at an angle (a "diffraction angle") and this angle is proportional to the wavelength of the light, thereby tending to fan out multichromatic light. Attention is directed to E. I. Gordon, *Applied Optics* Vol. 5, p. 1629 for a more complete discussion of acousto-optic cells.

Prior art devices use the change in light direction to change the angle of incidence of the light on a diffraction grating. The diffraction grating acts as a dispersive element in that it disperses the light into its frequency components. A tuning device is created by arranging the grating so that only one wavelength, determined by the angle of incidence from the A-O cell, is reflected back through the cavity to the output.

The angle of diffraction of the A-O cell is changed by changing the frequency of the acoustic wave in the cell. This in turn tunes the laser to different wavelengths.

A disadvantage of using a diffraction grating is that some light is scattered and lost from the system.

SUMMARY OF THE INVENTION

The present invention employs an A-O cell in a manner which causes it to function as the dispersive element in the cavity as well as the deflecting element. By altering the frequency of the acoustic wave in the cell, the cell acts as an acoustic-optic "lens" with a focal length and focal position which are functions of the wavelength of the light passing through it as well as the rate of change of the acoustic frequency. By placing the A-O cell in the laser cavity and a small aperture at, for example, the focal point for a given wavelength, essentially monochromatic light can be reflected back to the output mirror, thereby tuning the laser. The arrangement is optimized by a beam expander which permits optimum use of the A-O cell.

An advantage of the present invention is that the back reflector, instead of a diffraction grating, can be a mirror or polished surface which is, for practical purposes, one hundred percent efficient.

DESCRIPTION OF THE PREFERRED EMBODIMENTS

Figure 1:
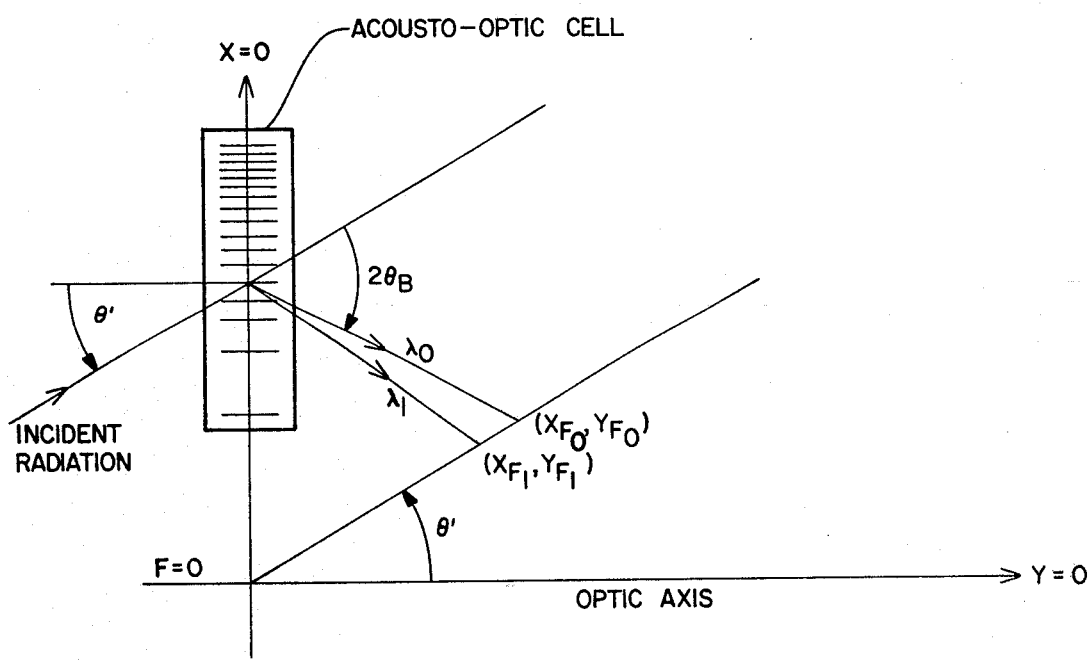
FIG. 1 is a graphical diagram of the lens effect of an acousto-optic (A-O) cell.

An acousto-optic cell is a transparent medium with a large photo elastic constant. Because of the large photo elastic constant, a small strain induced by a sinusoidal acoustic wave can cause a relatively large change in the local index of refraction. When a light wave is incident on an acousto-optic cell which has been excited by a traveling acoustic wave, the light is scattered or deflected from these local variations in the index of refraction. Referring now to FIG. 1, deflection angle $2\theta_B$ is a function of the wavelength of both the light and the sound being given to an approximation as $$2\theta_B = \lambda/\Lambda \tag{1}$$

The B subscript indicates that light should strike the sound waves at the Bragg angle $\theta_B$. $\Lambda$ is the acoustic wavelength and $\lambda$ is the wavelength of the light.

If, instead of using a constant frequency acoustic input wave form, an acoustic waveform with a frequency which varies linearly with time is used, then as equation (1) shows, the deflection angle, $2\theta_B$, for some portions of the cell will be different from the deflection angle for other portions of the cell because $\Lambda$ is no longer constant across the cell. The linear variation of frequency with position in the cell gives just the same deflection angle variation with radial position as an equivalent cylindrical lens with one surface plane and one surface circular of radius of curvature R where $$R = (n-1) \, v^2/(\lambda \, df/dt),$$

where:

$n$ = index of refraction of the equivalent cylindrical lens, $v$ = acoustic wave velocity, and $df/dt$ = rate of change of acoustic frequency with time.

The focal length of this equivalent cylindrical lens is $R/n-1 = v^2/(\lambda \, df/dt)$ and the focus occurs at a distance $\theta' \, v^2/(\lambda \, df/dt)$ from the center of the focal plane, where $\theta'$ is the angle of the incident radiation onto the plane of the acousto-optic cell. A line perpendicular to the cell and passing through the point where the acoustic frequency is zero also passes through the center of the focal plane. This may be called the optic axis of the cell. It will be below the cell because the acoustic frequency in the cell can never be truly zero. Now, if multichromatic light is incident on the cell angle $\theta'$, then, because $\lambda$ assumes many values, the focal length assumes many values as does the transverse distance from the center of the focal planes at which the respective foci occur. By assigning $Y_F$ as the distance of the focus from the optic axis for a given value of $\lambda$ and $X_F$ as the distance from the cell to the focal plane for the same value of $\lambda$ we obtain $$X_F = v^2/(\lambda \, df/dt)$$

$$Y_F = \theta' v^2/\lambda(df/dt) \qquad (2)$$

so that $$Y_F = \theta' X_F.$$

Thus the foci for different wavelengths occur in a plane tipped at angle $\theta'$ relative to the optic axis of the cell. As FIG. 1 shows, the ray bundles for the different wavelengths are incident on this plane at a grazing angle of $2\theta_B$.

To continue with the mathematical model, the spectral resolution of the present invention may be calculated. This will indicate the bandwidth of the output light. The diffraction limited spot size at the focal plane of an acousto-optic lens of width $L$ is $$\Delta Y_F = (\lambda/L) X_F = v^2/(L df/dt).$$

This corresponds to a spot size in the tipped focal plane of $$\Delta S_F = v^2/(2L \, df/dt \, \theta_B). \qquad (3)$$

Taking the differential of (2) along the tipped plane with respect to $\lambda$ yields $$\Delta S_F = [(\Delta X_F)^2 + (\Delta Y_F)^2]^{\frac{1}{2}} = v^2/(\lambda^2 df/dt)(1 + \theta'^2)^{\frac{1}{2}} \Delta \lambda \qquad (4)$$

Combining (3) and (4) yields $$\Delta \lambda = (\lambda^2)/[2L\theta_B(1 + \theta'^2)^{\frac{1}{2}}] \qquad (5)$$

In order to match the Bragg condition for the band of wavelengths involved, $\theta'$ should equal $$\lambda_M/2<\Lambda> \text{ where}$$

$<\Lambda>$ is the mean instantaneous acoustic wavelength in the cell at the time the laser is pulsed and $\lambda_M$ is the mean light wavelength in the laser fluorescence band. Under usual experimental conditions $\lambda_M/2<\Lambda> \ll 1$ so that the $\theta'^2$ term in the denominator may be dropped and $\theta_B = \lambda/2(\Lambda)$ may be used in (5) to obtain $\theta_B = \Lambda/2<\Lambda>$ $$\Delta\lambda/\lambda = <\Lambda>/L, \text{ or} \qquad (6)$$

$$\Delta\lambda/\lambda = v/<f>L. \qquad (7)$$

For a paratellurite (TeO$_2$) acousto-optic cell where $v = 617$ m/sec and $L = 1$cm and $<f> = 10^8$Hz, $\Delta\lambda/\lambda = 6.17 \times 10^{-4}$ or $\Delta\lambda = 3.09$A at an optical wavelength of 5000A. This degree of resolution is about equivalent to that achieved by using a diffraction grating as the feedback element in the prior art arrangement previously described.

Figure 2:
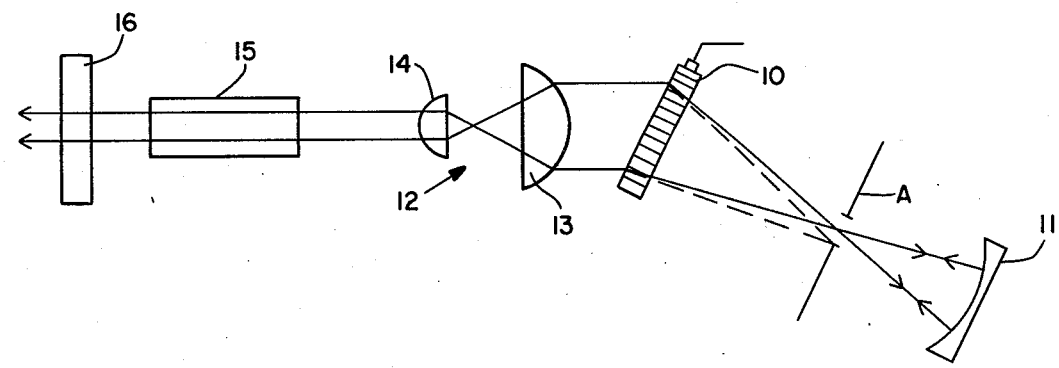
FIG. 2 is a schematic illustration of one preferred embodiment of a device of the present invention employing a focal point aperture and a convergent back reflector.

FIG. 2 shows an example of an optical set up which uses an acousto-optic lens 10 as the tuning element for a laser. For maximum spectral resolution one puts an aperture A at the focus of the acousto-optic lens of width in the $y$ direction $$\Delta Y_F = v^2/(L \, df/dt)$$

At a distance $X_F$ beyond this one places a cylindrical mirror 11 of radius of curvature $X_F$ so as to cause the output rays to retrace themselves back through the acousto-optic lens. As illustrated by broken lines, light wavelengths focused to a different spot on the focal plane are blocked by the aperture. When using the tuning arrangement of the present invention, the back reflector can return essentially 100% of the light incident on it. In prior art devices which employ a diffraction grating, some light is lost to scattering, an especially undesirable phenomenon in low energy systems.

The beam expander 12 simply expands the output beam of the laser medium so that it covers the entire acousto-optic cell 10. This is necessary to achieve maximum spectral resolution. The large lens 13 of the beam expander 12 is positioned so as to recollimate the beam through small lens 14 and through the laser medium 15 and output mirror 16.

Where high power outputs are obtained, passing the light through a focus is undesirable because of the possibility of air breakdown (ionization). An alternative optical set up is therefore shown in FIG. 3. If the laser operates in its lowest transverse mode then the beam divergence at the acousto-optic lens is about $\lambda/L$. If $2\Delta\theta_B = \Delta\lambda/\Lambda$ we have $\Delta\theta = \Delta\lambda/\Lambda = \lambda/L$ so that $\Delta\lambda/\lambda = \Lambda/L$ as in (6). To guarantee that the laser will operate in its lowest mode one has only to make both end mirrors 16, 17 slightly concave and to put in apertures $A_1$ and $A_2$ on either side of the laser gain medium 15. The diameters of the apertures $A_1$ and $A_2$ may be calculated by known procedures as given for example by Yariv in *Quantum Electronics*, pp. 230–236 (John Wiley & Sons, Inc., N.Y., 1967).

Figure 3:
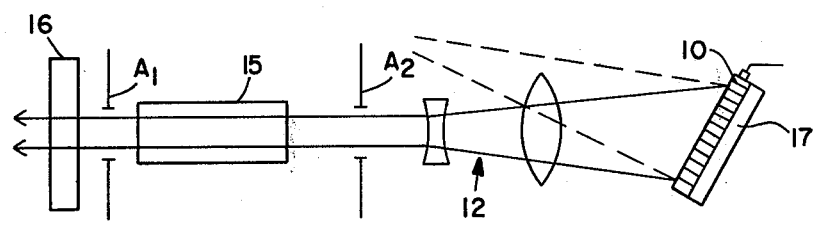
FIG. 3 is a schematic illustration of another embodiment of a device of the present invention employing parallel beam apertures and an essentially planar back reflector.

In FIG. 3 the beam expander 12 has a negative focal length of $X_F$ so that rays incoming to the cell are slightly divergent. The back mirror 17 is a first surface reflector affixed to the cell and returns the rays toward the laser medium converging to a point $X_F$ away from the cell and toward the laser gain medium 15. In this way, the Bragg condition is met at all points in the cell for both incoming and outgoing rays. The operability of this embodiment lies in the fact that, when the cell is focusing, incoming and outgoing rays are mirror images of each other.

In order to electrically tune the wavelength of a laser it is first noted that $$X_F = v^2/(\lambda \, df/dt) \quad (2)$$

$\lambda$ may be varied in a manner inversely proportional to $df/dt$ if the aperture position, $X_F$, is kept fixed. Tuning may be accomplished by varying the chirp rate, $df/dt$, from pulse to pulse. This may be done with a standard sweep generator set up to deliver chirped electrical pulses to a transducer on the cell. As discussed above in connection with FIG. 1, and shown therein, the optic axis of the lens is a line through the point where the acoustic frequency is zero. This point is actually below the bottom surface of the cell. Because an acoustic waveform moves with velocity $v$ transverse to the cell, so does this optic axis; and because $Y_F$ is defined relative to this axis, $Y_F$ also moves at velocity $v$. This means for maximum spectral resolution (i.e. to avoid chirping the output light spectrum), the length of the laser pump pulse should be less than $1/B$ where $B = (df/dt)T$ with $T = L/v$, the transit time for the acoustic wave across the cell. For a typical system $B = 5 \times 10^7$ Hz so that $1/B = 20$ nsec and the pump pulse should be shorter than this to avoid chirping the output spectrum. Because the transit time, T, for a typical acoustic-optic material, is $10^{-5}$ sec, in order to set up a new waveform in the cell between laser pulses (i.e. a waveform with a different $df/dt$ and a different $\lambda$) the pulse repetition rate should be no greater than $10^5$Hz for a 1 cm cell.

What is claimed is:

1. A method for tuning a pulsed laser beam in a laser having a laser gain medium between an output element and a back reflector comprising the steps of:
   passing said laser beam through substantially the entire length of an acousto-optic cell disposed between said laser medium and said back reflector;
   focusing said laser beam by propagating a chirped acoustic pulse through said acoustic-optic cell;
   providing spectral resolution of said laser beam into wavelength components by propagating a chirped acoustic pulse through said acousto-optic cell;
   blocking all but one of said wavelength components with an aperture; and
   reflecting one wavelength component with said back reflector through the acousto-optic cell, the laser gain medium and the output element.

2. The method of claim 1 further including the step of:
   making said laser beam divergent before it passes through said acousto-optic cell.

3. In a pulsed laser having an optical cavity wherein a laser beam passes along the optical path in said cavity,
   a tuning device comprising
   an acousto-optic cell along the optical path, in the optical cavity;
   a beam expander along the optical cavity for enlarging said laser beam in order that it passes through substantially the entire length of said cell.
   means connected to the acousto-optic cell for impressing a chirped acoustic wave on the acousto-optic cell whereby laser light passing through the cell is focused into a number of wavelength components;
   a one hundred percent back reflector at one end of the optical cavity and at a fixed point along the optical path for reflecting at least one wavelength component back through the optical cavity; and
   means at a fixed point along the optical path in the optical cavity for blocking all but one wavelength component from exiting the laser cavity.

4. The device of claim 3 wherein the beam expander is a pair of lenses which collimate the laser beam.

5. The device of claim 3 wherein said one hundred percent back reflector is a concave mirror.

6. The device of claim 5 wherein said means for blocking all but one wavelength component is an aperture along the optical path between the acousto-optic cell and the concave mirror.

7. The device of claim 3 wherein said beam expander is a divergent lens.

8. The device of claim 3 wherein said one hundred percent back reflector is affixed to the acousto-optic cell.

9. The device of claim 8 wherein said one hundred percent back reflector and said acousto-optic cell are at the Bragg angle to the beam diverging to the acousto-optic cell.

10. The device of claim 3 wherein said means for blocking all but one wavelength component is at least one aperture at a fixed position along the optical path between the output mirror and the beam expander.

* * * * *